(12) United States Patent
Shimizu et al.

(10) Patent No.: US 12,494,497 B2
(45) Date of Patent: Dec. 9, 2025

(54) METHOD FOR CONTROLLING FUEL CELL SYSTEM, FUEL CELL VEHICLE, AND FUEL CELL SYSTEM

(71) Applicant: HONDA MOTOR CO., LTD., Tokyo (JP)

(72) Inventors: Kenichi Shimizu, Tokyo (JP); Kenta Suzuki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 17/956,354

(22) Filed: Sep. 29, 2022

(65) Prior Publication Data

US 2023/0103388 A1 Apr. 6, 2023

(30) Foreign Application Priority Data

Sep. 30, 2021 (JP) ................. 2021-161209

(51) Int. Cl.
*H01M 8/04858* (2016.01)
*H01M 8/04537* (2016.01)

(52) U.S. Cl.
CPC ... *H01M 8/04932* (2013.01); *H01M 8/04567* (2013.01); *H01M 8/04947* (2013.01); *H01M 2250/20* (2013.01)

(58) Field of Classification Search
CPC . H01M 8/04–04953; H02M 7/00–003; H02M 7/42–44; B60L 3/00; B60L 3/12; B60L 15/00; B60L 15/02–04; B60L 15/20–2045
See application file for complete search history.

(56) References Cited

U.S. PATENT DOCUMENTS

| | | | |
|---|---|---|---|
| 6,590,370 B1 | 7/2003 | Leach | |
| 2009/0142634 A1* | 6/2009 | Fujino | H01M 8/04947 429/421 |
| 2015/0180070 A1* | 6/2015 | Matsusue | H01M 8/2457 429/432 |
| 2017/0066337 A1 | 3/2017 | Kazuno et al. | |

FOREIGN PATENT DOCUMENTS

| | | |
|---|---|---|
| CN | 101478049 A | 7/2009 |
| CN | 110001908 A | 7/2019 |
| CN | 113276729 A | 8/2021 |
| CN | 113364108 A | 9/2021 |
| JP | H07-320752 A | 12/1995 |
| JP | 2001-231176 A | 8/2001 |

(Continued)

OTHER PUBLICATIONS

Office Action dated Dec. 25, 2024 issued in the corresponding Chinese Patent Application No. 202211184069.5 with the English machine translation thereof.

(Continued)

*Primary Examiner* — Nicole M. Buie-Hatcher
*Assistant Examiner* — Jacob Buchanan
(74) *Attorney, Agent, or Firm* — Carrier, Shende & Associates P.C.; Joseph P. Carrier; Fulchand P. Shende

(57) ABSTRACT

An electronic control device of a fuel cell vehicle controls a generated power output that is electric power of a fuel cell, in a manner so that a stored power voltage of a power storage device does not fall below a generated power voltage of the fuel cell.

8 Claims, 8 Drawing Sheets

(56) References Cited

FOREIGN PATENT DOCUMENTS

| | | |
|---|---|---|
| JP | 2005-151643 A | 6/2005 |
| JP | 2005-310740 A | 11/2005 |
| JP | 2006-501798 A | 1/2006 |
| JP | 2009-277584 A | 11/2009 |
| JP | 2017-051042 A | 3/2017 |
| JP | 2018-019533 A | 2/2018 |
| TW | 201214841 A | 4/2012 |

OTHER PUBLICATIONS

Office Action dated Mar. 14, 2023 issued in the corresponding Japanese Patent Application No. 2021-161209 with the English translation thereof.

* cited by examiner

METHOD FOR CONTROLLING FUEL CELL SYSTEM, FUEL CELL VEHICLE, AND FUEL CELL SYSTEM

CROSS-REFERENCE TO RELATED APPLICATIONS

This application is based upon and claims the benefit of priority from Japanese Patent Application No. 2021-161209 filed on Sep. 30, 2021, the contents of which are incorporated herein by reference.

BACKGROUND OF THE INVENTION

Field of the Invention

The present invention relates to a method for controlling a fuel cell system, to a fuel cell vehicle, and to a fuel cell system, the fuel cell system and the fuel cell vehicle including a motor driven by a so-called hybrid power supply using an output of a fuel cell (generated power output, unit: [W]) and an output of a power storage device (stored power output, unit: [W]).

Description of the Related Art

This type of technology is disclosed, for example, in JP 2017-051042 A. In this technology, maximum use of the combined output of the generated power output and the stored power output for driving a motor is made possible. For this purpose, there are provided a converter for a fuel cell that converts a low-voltage generated power output into a high-voltage generated power output, and a converter for a power storage device that converts a low-voltage stored power output into a high-voltage stored power output.

In this case, the output voltage (generated power voltage) of the fuel cell is controlled so as not to exceed the output voltage (stored power voltage) of the power storage device by varying the boost ratio of both converters.

SUMMARY OF THE INVENTION

In fuel cell systems and fuel cell vehicles, cost reduction is an important issue. For example, it is considered that the cost of the fuel cell system and the fuel cell vehicle can be reduced by eliminating the converter for the power storage device.

However, in a case where the converter for the power storage device is eliminated and the output terminal of the converter for the fuel cell and the power storage device are directly connected to each other, the following problem occurs if it is attempted to make maximum use of the combined output of the generated power output and the stored power output.

When the stored power output is used as a high output, the voltage of the power storage device (stored power voltage) decreases. When the decreased stored power voltage becomes lower than the generated power voltage, it becomes impossible to control the converter for the fuel cell into a boost state. The problem arises in that the fuel cell and the power storage device are in a so-called direct connection state.

In this direct connection state, the output voltage (generated power voltage) of the fuel cell becomes equal to the output voltage (stored power voltage) of the power storage device. Therefore, there is a problem in that the generated power output becomes uncontrollable and the fuel cell deteriorates.

An object of the present invention is to solve the above-described problems.

According to an aspect of the present invention, provided is a method for controlling a fuel cell system, wherein the fuel cell system includes: a fuel cell configured to generate a voltage that is a generated power voltage; a power storage device configured to generate a voltage that is a stored power voltage; a load that is formed from a motor and an inverter, the inverter including a direct current terminal connected to the power storage device, and an alternating current terminal connected to the motor; and a boost converter including an input terminal connected to the fuel cell, and an output terminal connected to the direct current terminal of the inverter and to the power storage device, the method including: acquiring the generated power voltage and the stored power voltage; and controlling a generated power output that is electric power of the fuel cell, in a manner so that the stored power voltage does not fall below the generated power voltage.

According to other aspects of the present invention, provided are a fuel cell system and a fuel cell vehicle each including: a fuel cell configured to generate a voltage that is a generated power voltage; a power storage device configured to generate a voltage that is a stored power voltage; a load that is formed from a motor and an inverter, the inverter including a direct current terminal connected to the power storage device, and an alternating current terminal connected to the motor; a boost converter including an input terminal connected to the fuel cell, and an output terminal connected to the direct current terminal of the inverter and to the power storage device; a memory; and a central processing unit configured to execute instructions recorded in the memory, wherein when the central processing unit controls the fuel cell, the power storage device, the motor, the inverter, and the boost converter, the central processing unit executes the instructions recorded in the memory to control a generated power output that is electric power of the fuel cell, in a manner so that the stored power voltage does not fall below the generated power voltage.

According to the present invention, the generated power output of the fuel cell is controlled so that the stored power voltage does not fall below the generated power voltage, in other words, so that the generated power voltage falls below the stored power voltage. As a result, the generated power voltage can be boosted to the stored power voltage at all times by the boost converter. Therefore, it is possible to avoid a situation in which the boosting operation of the boost converter is disabled due to the generated power voltage exceeding the stored power voltage, and in which the fuel cell and the power storage device are directly connected to each other through the boost converter in a non-boost state. Therefore, it is possible to prevent the deterioration of the fuel cell caused by the impossibility of control of the generated power output.

As a result, it is possible to eliminate the step-up/down converter for the power storage device which is disposed between the power storage device and the direct current terminal of the inverter and which has been required in the related art. Therefore, it is possible to reduce the cost for the eliminated step-up/down converter. Further, a space corresponding to the step-up/down converter can be increased.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

A preferred embodiment of a fuel cell system and a method for controlling the fuel cell system according to the present invention will be described in relation to a fuel cell vehicle that implements the method, with reference to the accompanying drawings.

[Description of Configuration Relating to Method for Controlling Fuel Cell Vehicle]

Figure 1:
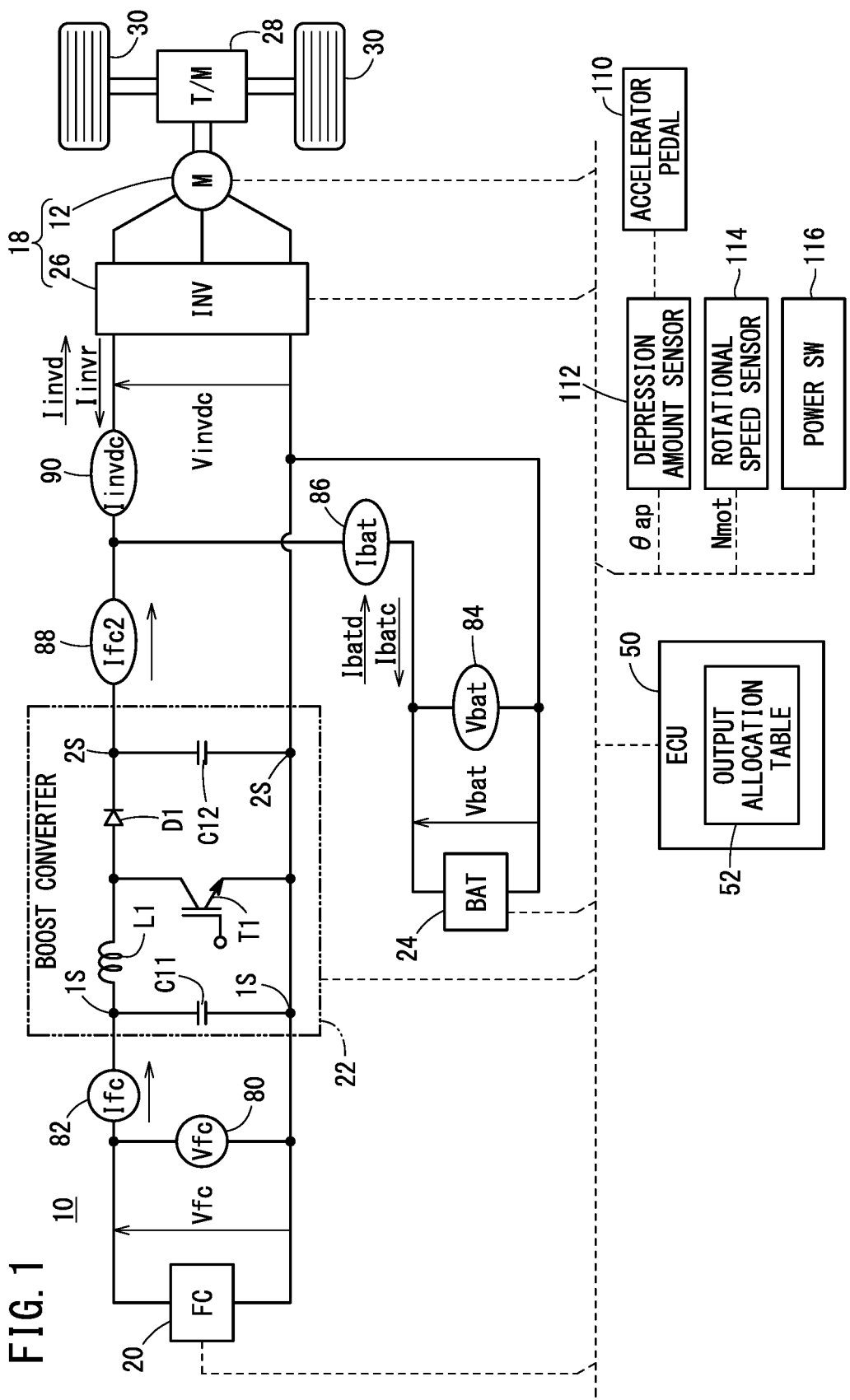
FIG. 1 is a schematic overall configuration diagram of a fuel cell vehicle according to an embodiment of the present invention that implements a method for controlling a fuel cell system according to the embodiment.

FIG. 1 shows a schematic configuration diagram of a fuel cell vehicle 10 (hereinafter, also referred to as "FCV 10" or "vehicle 10") serving as a fuel cell system according to this embodiment.

Figure 2:
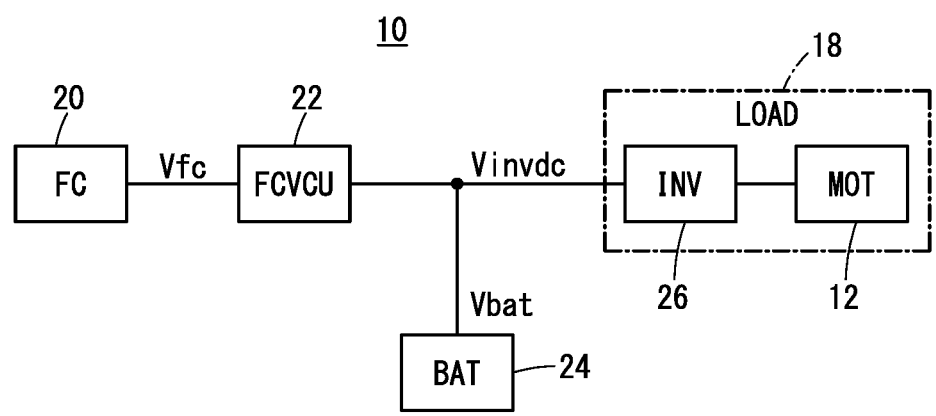
FIG. 2 is a simplified block diagram of the fuel cell vehicle shown in FIG. 1.

FIG. 2 shows a simplified block diagram of the FCV 10.

When the main load of the fuel cell system is a motor 12 for traveling (traction motor), the fuel cell system is referred to as the FCV 10. The method for controlling the fuel cell system according to this embodiment can also be applied to a fuel cell system of a plant or the like such as a factory facility, in which the main load is a motor other than a traction motor.

As shown in FIG. 1, the FCV 10 basically includes a fuel cell (also referred to as an FC) 20, a boost converter (also referred to as an FC converter or FC voltage control unit (FCVCU)) 22, a power storage device (also referred to as a BAT) 24, an inverter (also referred to as an INV) 26, the motor 12, a transmission (T/M) 28, wheels 30, and an electronic control unit (also referred to as an ECU) 50 that controls these components.

In FIG. 1, wiring (signal lines and the like) between the ECU 50 and the respective components is partially omitted to avoid complication.

The fuel cell 20 and the power storage device 24 basically function as parallel power supply devices (so-called hybrid power supply) of the FCV 10. The power supply devices supply a power output [W] to a load (also referred to as a main load) 18 formed from the inverter 26 and the motor 12.

That is, electric power (relatively low-voltage generated power output) Pfc [W] of the fuel cell 20 is supplied to the load 18 as a relatively high-voltage generated power output Pfc via the boost converter 22.

On the other hand, relatively high-voltage electric power (stored power output) Pbat [W] of the power storage device 24 is directly supplied to the load 18.

Although not shown, the stored power output Pbat is also supplied to, in addition to the load 18, auxiliary loads such as an air pump for driving the fuel cell 20, a lighting device of the FCV 10, and an electric power steering device.

The fuel cell 20 has, for example, a structure in which fuel cells formed by sandwiching a solid polymer electrolyte membrane between an anode and a cathode from both sides are stacked.

Although not shown, an anode system including a fuel gas supply source having a fuel tank, a cathode system including an oxygen-containing gas supply source having an air pump, a cooling system having a cooling pump, and the like, are provided near the fuel cell 20.

The anode system supplies and discharges a fuel gas (hydrogen) to and from the anode of the fuel cell 20. The cathode system supplies and discharges air containing oxygen (oxygen-containing gas) to and from the cathode of the fuel cell 20. The cooling system cools the fuel cell 20 with a coolant in order to maintain the fuel cell 20 at a predetermined temperature.

The power storage device 24 is an energy storage including a plurality of battery cells, and for example, a lithium ion secondary battery, a nickel-hydrogen secondary battery, or the like can be used as the power storage device 24. In the present embodiment, a lithium ion secondary battery is used. A capacitor can also be used as the power storage device 24.

The boost converter 22 is a chopper step-up converter (boost voltage converter). As shown in the drawing, the boost converter 22 includes, for example, a choke coil (inductor) L1, a diode D1, a switching element (transistor) T1, and smoothing capacitors C11 and C12.

The boost converter 22 performs duty control for turning on/off (repeating ON and OFF of) the switching element T1 in accordance with a duty ratio D (a ratio of the "ON period" to the "ON period+OFF period" of the switching element T1). By this duty control, a generated power voltage Vfc, which is an output voltage of the fuel cell 20, is boosted and applied to the inverter 26 on a secondary side 2S as an inverter direct current (DC) terminal voltage Vinvdc (Vinvdc=Vbat). The boost ratio (Vbat/Vfc) is calculated as (Vbat/Vfc)={1/(1-D)}, as is well known.

The inverter 26 is, for example, a three phase full-bridge DC/AC inverter that operates bidirectionally. During power running of the FCV 10 (motor 12) in which the motor 12 is driven by the output of the fuel cell 20 and/or the power storage device 24, the inverter 26 converts DC running power generated at the DC terminal of the inverter 26 into three phase AC power based on the generated power output Pfc and/or the stored power output Pbat, and supplies the three phase AC power to the motor 12.

On the other hand, during regeneration in which the motor 12 rotates without being driven through the inverter 26, the inverter 26 converts three phase AC power generated in the motor 12 into DC power (both of which are regenerative powers) and supplies the DC power to the power storage device 24.

A voltage sensor 80 that detects the generated power voltage Vfc of the fuel cell 20 and a current sensor 82 that detects a generated power current Ifc of the fuel cell 20 are disposed between the fuel cell 20 and a primary side 1S of the boost converter 22.

A voltage sensor 84 that detects a stored power voltage Vbat of the power storage device 24 and a current sensor 86 that detects a stored power current Ibat of the power storage device 24 are disposed between the secondary side 2S of the boost converter 22 and the power storage device 24.

A current sensor 88 that detects a generated power current Ifc2 after boosting is disposed at the secondary side 2S of the boost converter 22.

A current sensor 90 that detects an inverter DC terminal current Iinvdc is disposed at the DC terminal of the inverter 26.

In FIGS. 1 and 2, it is noted that in this FCV 10, since the power storage device 24 is directly connected to the DC terminal of the inverter 26, the inverter DC terminal voltage Vinvdc of the inverter 26 is equal to the stored power voltage Vbat (Vinvdc=Vbat). That is, the DC terminal voltage Vinvdc can be detected (measured) by the voltage sensor 84.

An accelerator pedal 110 for increasing/decreasing or maintaining the vehicle speed is disposed in the FCV 10, and a depression amount sensor 112 that detects a depression amount of the accelerator pedal 110 as an accelerator pedal opening degree Gap is disposed on the accelerator pedal 110.

A rotational speed sensor 114 that detects a rotational speed Nmot of the motor 12 is disposed on the motor 12.

Further, a power switch (power SW) 116 of the FCV 10 is disposed on a dashboard.

Signals from these sensors and the power switch 116 are supplied through signal lines (some of which are not shown) to the electronic control unit (ECU) 50, which is a control device. The ECU 50 acquires physical quantities of the various sensors, ON/OFF of the power switch 116, and the like, as signals via the signal lines. The signal line is not limited to a wired line and may be a wireless line.

The ECU 50 includes an input/output device, a computation device (including a CPU), and a storage device (memory). The ECU 50 detects the signal and executes a program (control program) recorded in the storage device, thereby functioning as various functional units to control the FCV 10. The ECU 50 is not limited to one, and may be divided for controlling the fuel cell 20, the load 18, and the power storage device 24.

Figure 3:
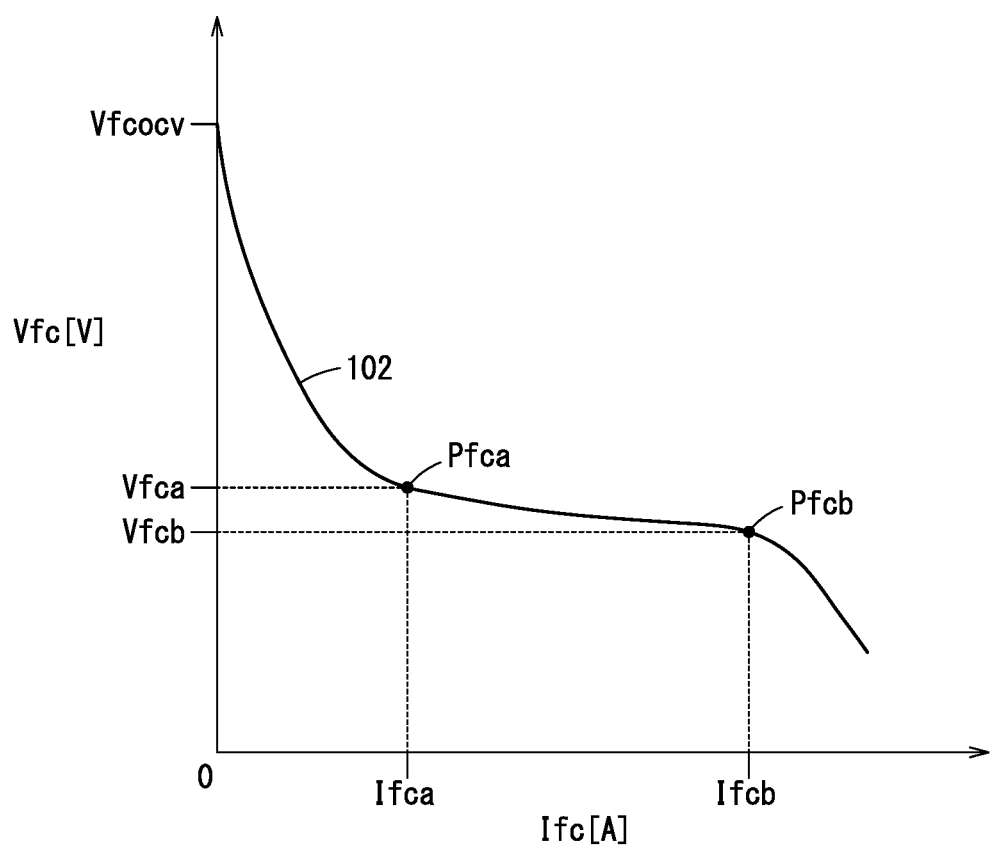
FIG. 3 is an IV characteristic diagram of a fuel cell.

FIG. 3 shows an output characteristic (IV characteristic) 102 of the fuel cell 20.

The output characteristic 102 of the fuel cell 20 is a characteristic in which the generated power current Ifc increases as the generated power voltage Vfc decreases from an open circuit voltage Vfcocv. More specifically, when the generated power current Ifc is drawn from the fuel cell 20 having the open circuit voltage Vfcocv to a threshold generated power current Ifca, the generated power voltage Vfc decreases from the open circuit voltage Vfcocv at a relatively steep slope.

Next, when the generated power current Ifc is drawn from the threshold generated power current Ifca to a threshold generated power current Ifcb, the generated power voltage Vfc decreases at a gentle slope.

Further, when the generated power current Ifc is drawn beyond the threshold generated power current Ifcb, the generated power voltage Vfc decreases at a steep slope.

Figure 4:
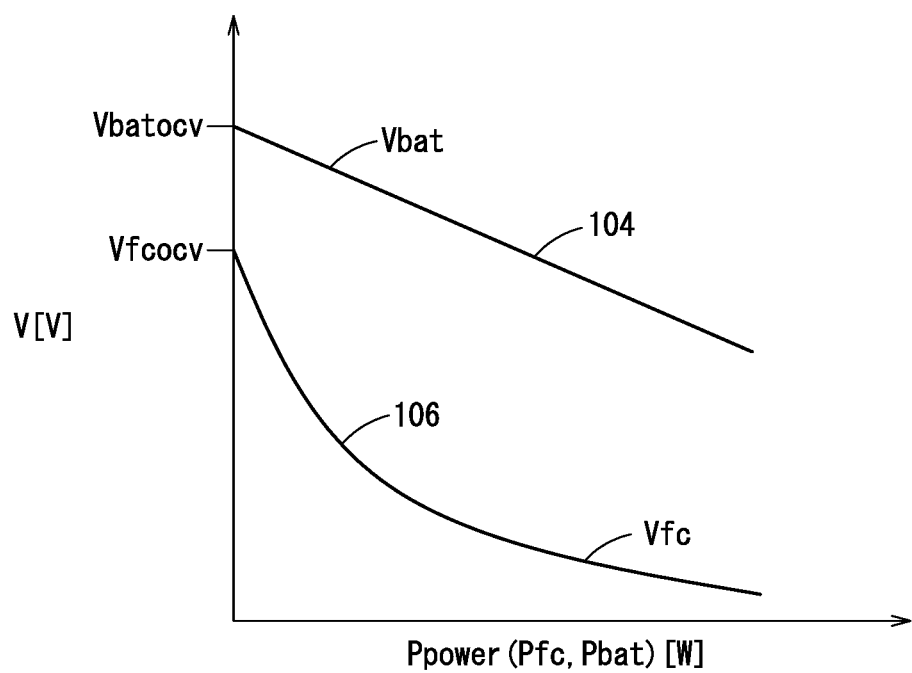
FIG. 4 is a characteristic diagram of the stored power voltage and the generated power voltage with respect to a power supply output.

FIG. 4 is a characteristic diagram showing a characteristic 106 of the generated power voltage Vfc with respect to a power supply output Ppower (generated power output Pfc) [W] and a characteristic 104 of the stored power voltage Vbat with respect to the power supply output Ppower (stored power output Pbat) [W].

As can be seen from the characteristic 106, the generated power voltage Vfc of the fuel cell 20 decreases as a decreasing quadratic function, as the generated power output Pfc increases.

As can be seen from the characteristic 104, the stored power voltage Vbat of the power storage device 24 decreases as a linear function (linearly) in negative proportion to an increase in the stored power output Pbat.

Figure 5:
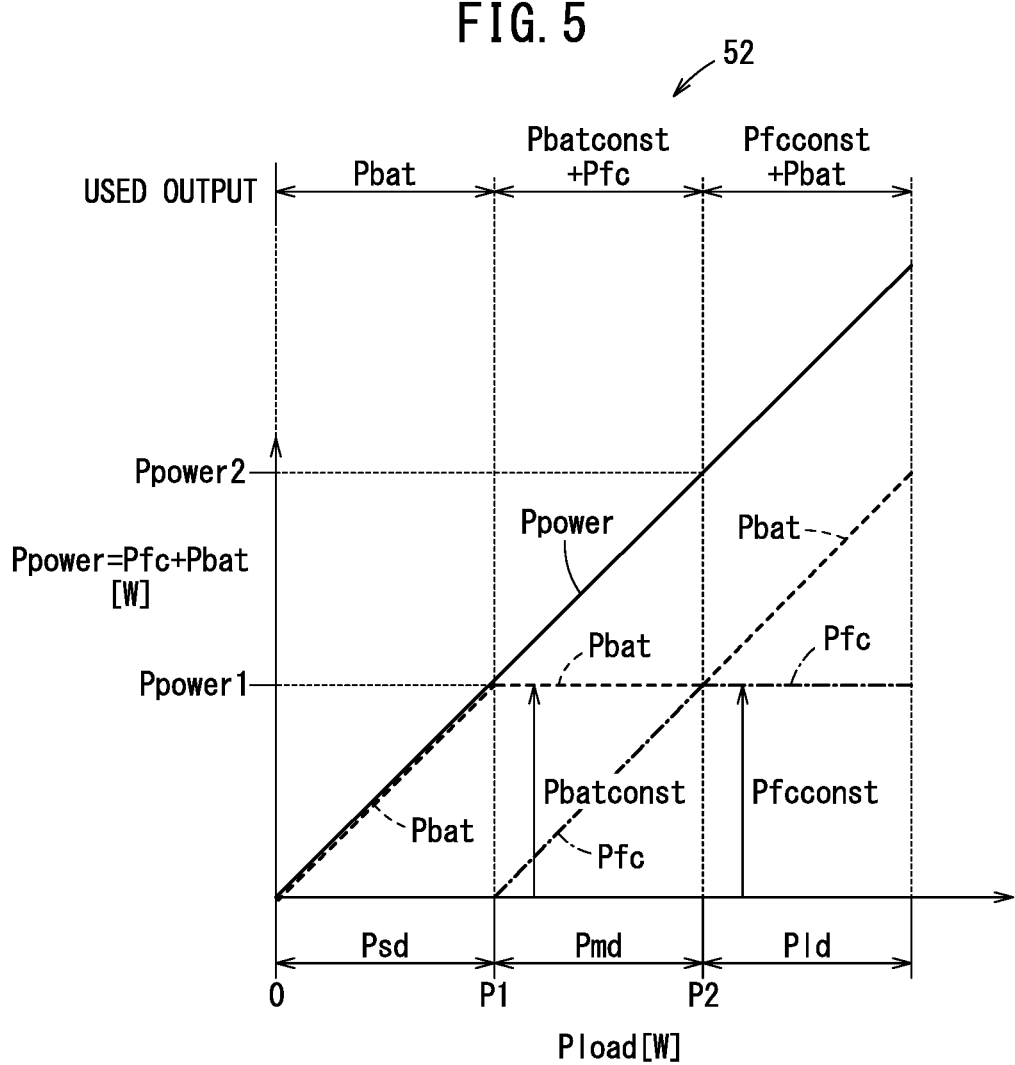
FIG. 5 is an output allocation table showing the allocation of the power supply output to a load output required by a load.

FIG. 5 shows an output allocation table 52 that is recorded in advance in the storage device of the ECU 50.

The horizontal axis represents a load output Pload [W] that is an output required by the load 18 (the inverter 26 and the motor 12), and the vertical axis represents the power supply output Ppower [W] supplied as the load output Pload.

The power supply output Ppower is a combined output of the generated power output Pfc and the stored power output Pbat (Ppower=Pfc+Pbat).

In a low-output region Psd of the load output Pload [W] from an electric power of 0 to a load output P1, the load output Pload is covered only by the stored power output Pbat indicated by a broken line.

In a medium-output region Pmd from the load output P1 to a load output P2, the load output Pload is covered by a combined output (Pbatconst+Pfc) of a constant stored power output Pbatconst which is a threshold output and indicated by a broken line, and the generated power output Pfc indicated by a one dot chain line.

In a high-output region Pld equal to or greater than the load output P2, the load output Pload is covered by a combined output (Pfcconst+Pbat) of a generated power output Pfcconst maintained at a constant value and indicated by a one dot chain line and the stored power output Pbat indicated by a broken line.

A thick solid line indicates the power supply output Ppower (Ppower=Pbat+Pfc), which is the combined output.

Figure 6:
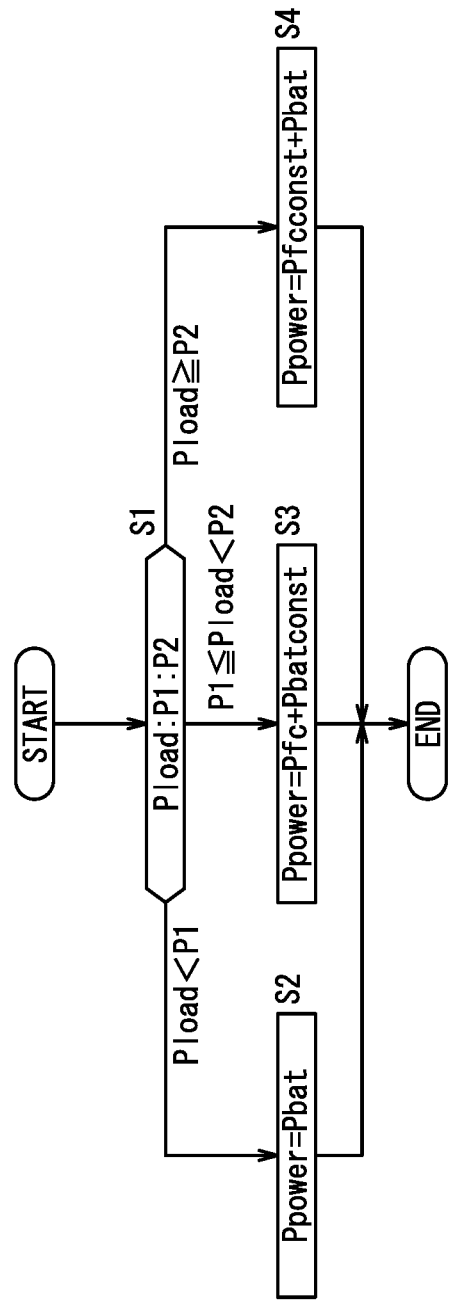
FIG. 6 is a flowchart showing a procedure for using the output allocation table.

FIG. 6 is a flowchart showing a procedure for using the output allocation table 52 by the ECU 50.

When the power switch 116 of the FCV 10 is in the ON state, in step S1, the ECU 50 compares the load output P1 and the load output P2, which are thresholds (reference values), with the load output Pload required by the load 18.

When the load output Pload is less than the load output P1 (Pload<P1), in step S2, the power supply output Ppower is set to the stored power output Pbat (Ppower=Pbat).

When the load output Pload is greater than or equal to the load output P1 and less than the load output P2 (P1 Pload<P2), in step S3, the power supply output Ppower is set to a combined output (Ppower=Pfc+Pbatconst) of the constant stored power output Pbatconst and the generated power output Pfc.

When the load output Pload is equal to or greater than the load output P2 (Pload≥P2), in step S4, the power supply output Ppower is set to a combined output (Ppower=Pfcconst+Pbat) of the constant generated power output Pfcconst and the stored power output Pbat.

As described above, the output allocation table 52 is an output allocation basis in which the load output Pload, which is electric power required by the load 18, is determined in advance in accordance with the magnitude of the load output Pload. As will be described in detail later, the ECU 50 sets (determines) the allocation of the generated power output Pfc and the stored power output Pbat in accordance with the output allocation basis defined in the output allocation table 52, and controls the boost converter 22 and the like so as to cover the load output Pload.

[Description of Basic Operation of FCV 10]

The basic operation (power running control and regeneration control) of the FCV 10 basically configured as above will be described first.

During traveling, under the control of the ECU 50, a request for the load output Pload (requested load output) corresponding to the depression amount (accelerator pedal opening degree) Gap acquired from the depression amount sensor 112 of the accelerator pedal 110 is generated (during power running of the motor 12).

On the basis of the request for the load output Pload, the load 18 is driven by the generated power output Pfc (Pfc=Ifc×Vfc) supplied from the fuel cell 20 that is generating power, and/or the stored power output Pbat (Pbat=Vbat×Ibatd) supplied from the power storage device 24. Here, Ibatd is a discharge current.

In this case, the motor 12 driven via the inverter 26 generates a driving force that is a motive power for traveling. The wheels 30 are rotationally driven by the driving force through the transmission 28, and the FCV 10 travels. In this way, the ECU 50 performs power running control.

On the other hand, during regeneration of the motor 12, specifically, during deceleration in which the depression amount (accelerator pedal opening degree) Gap acquired from the depression amount sensor 112 of the accelerator pedal 110 is 0, that is, the accelerator pedal 110 is released, the ECU 50 performs the regeneration control.

During this regeneration control, the inverter 26 converts an inverter alternating current (AC) terminal power by the AC regenerative output (regenerative electric power) generated in the motor 12 into an inverter DC terminal power {(DC terminal voltage Vinvdc×inverter DC terminal current Iinvdc (regenerative current Iinvr))}.

The regenerative electric power generated by the motor 12 performing regeneration is stored (charged) in the power storage device 24 as the stored power current Ibatc.

[Description of Method for Controlling FCV 10]

Figure 7:
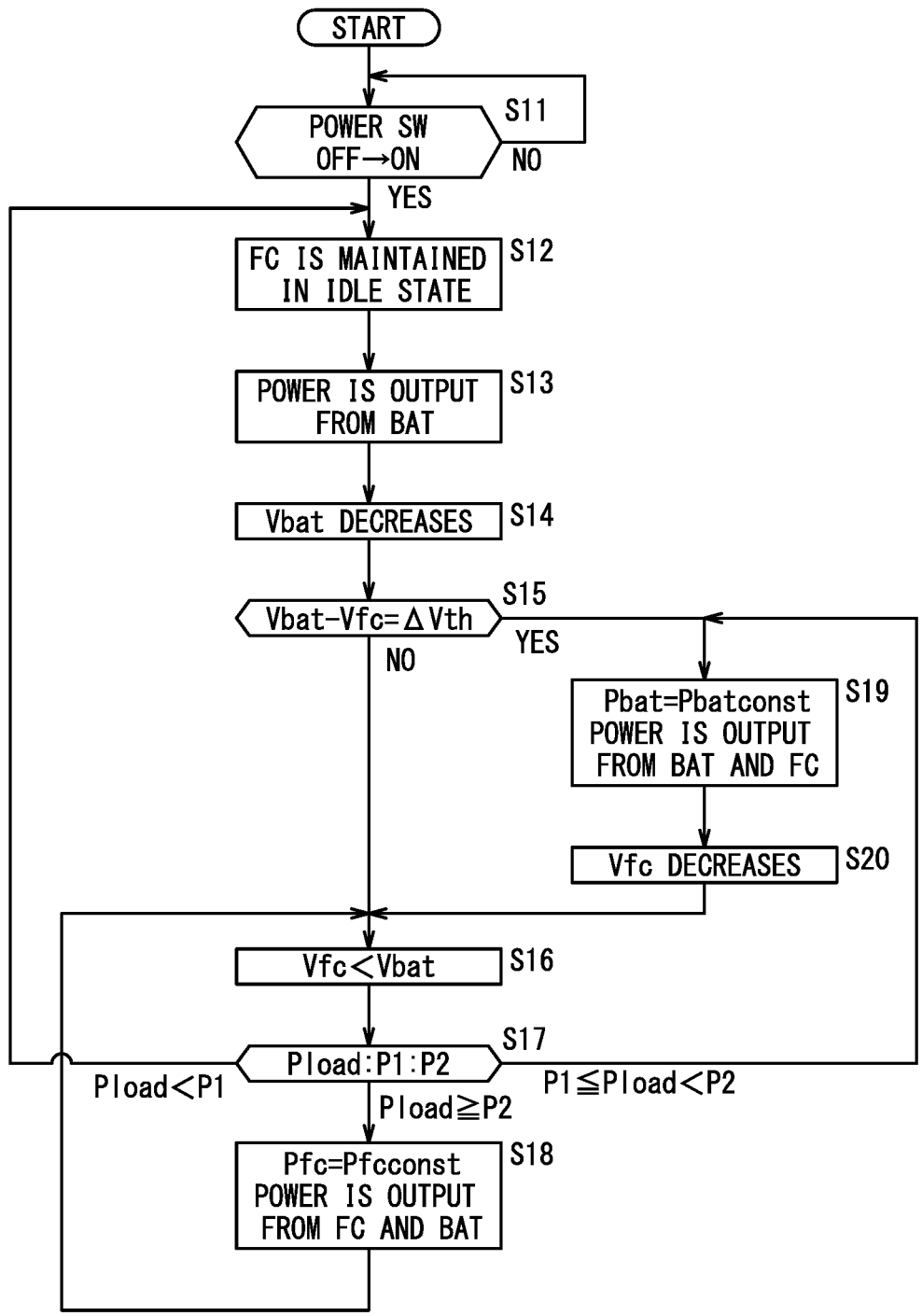
FIG. 7 is a flowchart for explaining the operation of the fuel cell vehicle according to the embodiment.

Next, a method for controlling the FCV 10 according to the embodiment will be described based on a flowchart of FIG. 7 and time charts shown in FIGS. 8A to 8C.

Figure 8A:
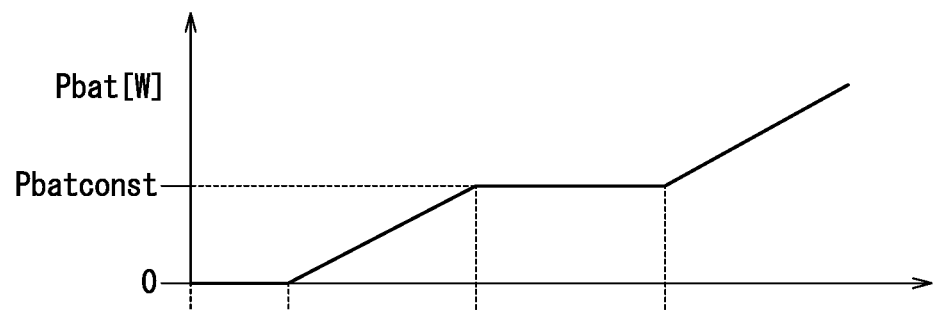
FIG. 8A is a time chart showing the state of usage of the stored power output by the load.
Figure 8B:
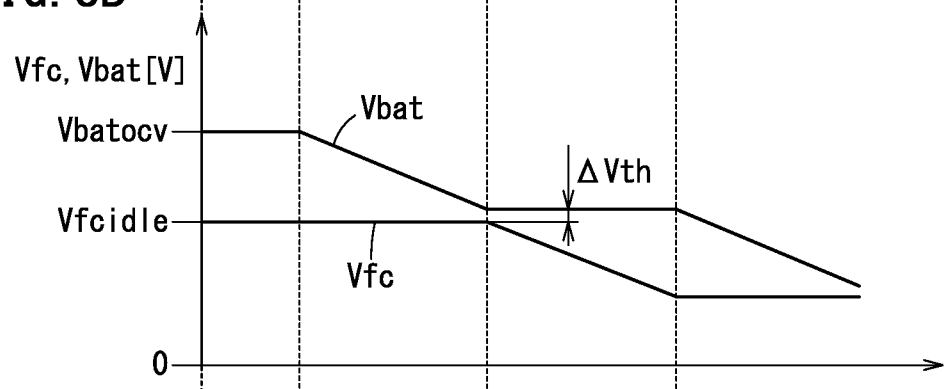
FIG. 8B is a time chart showing the transition of the stored power voltage and the generated power voltage according to the state of usage thereof by the load.
Figure 8C:
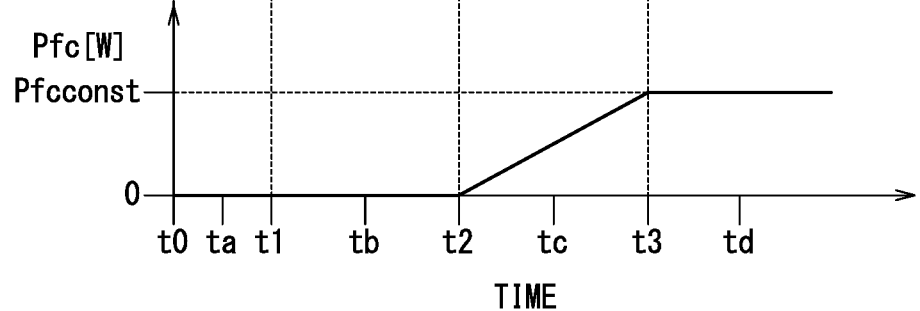
FIG. 8C is a time chart showing the state of usage of the generated power output by the load.

The 0 value of the stored power output Pbat and the 0 value of the generated power output Pfc shown in FIGS. 8A and 8C mean that the electric power supplied as the load output Pload has a 0 value.

The program according to the flowchart is executed by the ECU 50 serving as a control subject.

In step S11, whether or not the power switch 116 has transitioned from the OFF state to the ON state is monitored, and when it is confirmed that the power switch 116 has transitioned to the ON state (step S11: YES), the process proceeds to step S12.

In step S12, power generation of the fuel cell 20 is started, and the fuel cell 20 is maintained in an idle state.

As shown in FIG. 8A to FIG. 8C, between a time point t0 and a time point t1 (at a time point ta and the like), the generated power voltage Vfc is held at an idle generated power voltage Vfcidle (FIG. 8B) which is an appropriate voltage between the open circuit voltage Vfcocv and the generated power voltage (threshold voltage) Vfca that are shown in FIG. 3.

A generated power output Pfcidle related to the idle generated power voltage Vfcidle is supplied to an auxiliary load (not shown) or charged in the power storage device 24.

During the idle power generation period (t0 to t1), the stored power output Pbat of the power storage device 24 is supplied to the auxiliary load such as the air pump. The stored power voltage Vbat of the power storage device 24 is held at a value close to the open circuit voltage Vbatocv. It should be noted that since FIG. 8A shows the electric power supplied to the load 18, the value is 0 between the time point t0 and the time point t1.

On the other hand, after the time point t0 (step S12) and until the power switch 116 is switched from the ON state to the OFF state, the boost ratio {Vbat (Vinvdc)/Vfc} of the boost converter 22 is controlled by the ECU 50 so that the generated power voltage Vfc becomes a set voltage (target voltage).

Note that between the time point t0 and the time point t1, the boost ratio of the boost converter 22 is set to Vbatocv/Vfcidle (see FIG. 8B).

Next, in step S13, the stored power output Pbat is used as the load output Pload, and the FCV 10 travels (for example, at a time point tb between the time point t1 and the time point t2). That is, the load output Pload is covered only by the stored power output Pbat.

In this case, in step S14, a decrease in the stored power voltage Vbat is monitored as indicated during the period from the time point t1 to the time point t2.

Between the time point t1 and the time point t2, the boost ratio of the boost converter 22 is set to Vbat/Vfcidle.

Next, in step S15, it is determined whether or not a differential voltage (Vbat−Vfc) between the decreasing stored power voltage Vbat and the generated power voltage Vfc (in this case, the idle generated power voltage Vfcidle) has decreased to a threshold differential voltage ΔVth (≈0 [V]) determined in advance.

If the differential voltage has not decreased to the threshold differential voltage ΔVth (step S15: NO), then in step S16, it is monitored that the generated power voltage Vfc is lower than the stored power voltage Vbat (Vfc <Vbat) (for example, at the time point tb).

Next, in step S17, the same process as that described in step S1 (FIG. 6) is performed.

The ECU 50 compares the load output P1 and the load output P2, with the load output Pload required by the load 18.

When the load output Pload is less than the load output P1 (Pload <P1), the power supply output Ppower is set to the stored power output Pbat (Ppower=Pbat) in steps S12 to S17.

During the repetition of the processes of steps S12 to S17, when the stored power voltage Vbat decreases and the determination in step S15 becomes affirmative (Vbat−Vfc=ΔVth), the process proceeds to step S19.

In step S19, for example, at a time point tc between the time point t2 and a time point t3, the load output Pload is covered by the power supply output Ppower which is a combined output of the constant stored power output Pbat-const and the generated power output Pfc.

In step S20, a decrease in the generated power voltage Vfc in accordance with an increase in the generated power output Pfc is monitored, and the process proceeds to step S16.

In step S16, it is monitored that the generated power voltage Vfc is lower than the stored power voltage Vbat (Vfc <Vbat).

Next, in step S17, the same process as that described in step S1 (FIG. 6) is performed again. That is, the ECU 50 compares the load output P1 and the load output P2 with the load output Pload required by the load 18.

When the load output Pload is greater than or equal to the load output P1 and less than the load output P2 (P1≤Pload <P2), the process returns to step S19, and the load output Pload is covered by the power supply output Ppower which is a combined output of the constant stored power output Pbatconst and the generated power output Pfc.

While the processes of step S17 →step S19 →step S20 →step S16 are continuously repeated, when it is determined in step S17 that the load output Pload becomes greater than the load output P2 (Pload≥P2), the process proceeds to step S18.

In this step S18, the high load output Pload is covered by the power supply output Ppower (Ppower=Pfcconst+Pbat) which is a combined output of the constant generated power output Pfcconst and the stored power output Pbat (after the time point t3).

Thereafter, the processes of step S16 →step S17 →step S18 are repeated, and the process is selected based on the determination result in step S17.

[Modification]

The above embodiment can also be modified as follows.

When the process proceeds from step S17 to step S18, in other words, when transition is made from the medium-output region Pmd to the high-output region Pld of the load output Pload, the transition may be made when the generated power voltage Vfc decreases to a generated power voltage (threshold voltage) Vfcb determined in advance (FIG. 3) or when the generated power current Ifc exceeds a threshold generated power current Ifcb determined in advance (FIG. 3). By performing such transition control, it is possible to switch between the medium-output region Pmd and the high-output region Pld with simple control.

[Invention that can be Grasped from Embodiment and Modification]

The invention that can be grasped from the above embodiment will be described below. For convenience of understanding, some of the constituent elements are denoted by the reference numerals used in the above-described embodiment, but the constituent elements are not limited to those denoted by the reference numerals.

The present invention relates to the method for controlling the fuel cell system, wherein the fuel cell system includes: the fuel cell 20 configured to generate the generated power voltage Vfc; the power storage device 24 configured to generate the stored power voltage Vbat; the load 18 that is formed from the motor 12 and the inverter 26, the inverter 26 including a DC terminal connected to the power storage device 24, and an AC terminal connected to the motor 12; and the boost converter 22 including an input terminal connected to the fuel cell 20, and an output terminal connected to the DC terminal of the inverter 26 and to the power storage device 24, the control method including the steps of: acquiring the generated power voltage Vfc and the stored power voltage Vbat (step S16); and controlling the generated power output Pfc that is electric power of the fuel cell 20, in a manner so that the stored power voltage Vbat does not fall below the generated power voltage Vfc (steps S16, S17, S12, S18, S19).

In this way, the generated power output Pfc of the fuel cell 20 is controlled so that the stored power voltage Vbat does not fall below the generated power voltage Vfc, in other words, so that the generated power voltage Vfc falls below the stored power voltage Vbat. As a result, the generated power voltage Vfc can be boosted to the stored power voltage Vbat at all times by the boost converter 22. Therefore, it is possible to avoid a situation in which the boosting operation of the boost converter 22 is disabled due to the generated power voltage Vfc exceeding the stored power voltage Vbat, and in which the fuel cell 20 and the power storage device 24 are directly connected to each other through the boost converter 22 in a non-boost state. Therefore, it is possible to prevent deterioration of the fuel cell 20 caused by the impossibility of control of the generated power output Pfc.

As a result, it is possible to eliminate a step-up/down converter for the power storage device, which is disposed between the power storage device 24 and the DC terminal of the inverter 26 and which has been required in the related art. Therefore, it is possible to reduce the cost for the eliminated step-up/down converter. Further, a space corresponding to the step-up/down converter can be increased.

Further, in the method for controlling the fuel cell system, in the step of controlling the generated power output Pfc, control is performed in a manner so that the load output Pload, which is electric power required by the load 18, is covered by the generated power output Pfc and the stored power output Pbat of the power storage device 24 in accordance with the output allocation basis determined in advance in accordance with the magnitude of the load output Pload.

This makes it possible to mechanically control (process) the generated power output Pfc in accordance with the output allocation basis determined in advance.

Further, in the method for controlling the fuel cell system, in the step of controlling the generated power output, control is performed in a manner so that: in the low-output region Psd of the load output Pload, which is electric power required by the load 18, the load output Pload is covered only by the stored power output Pbat obtained by varying electric power of the power storage device 24; in the medium-output region Pmd of the load output Pload, the load output Pload is covered by the stored power output with a constant value Pbatconst and the generated power output Pfc obtained by varying the generated power output Pfc that is the electric power of the fuel cell 20; and in the high-output region Pld of the load output Pload, the load output Pload is covered by the generated power output with a constant value Pfcconst and a stored power output Pbat obtained by varying the stored power output Pbat.

As a result, in the fuel cell system, the power supply output Ppower serves as a hybrid power supply output of the stored power output Pbat and the generated power output Pfc.

In the low-output region Psd of the load output Pload, the stored power output Pbat is used without using the generated power output Pfc having low power efficiency. In the medium-output region Pmd of the load output Pload, both the generated power output Pfc and the stored power output Pbat that have high power efficiency are used. In the high-output region Pld of the load output Pload, the stored power output Pbat and the generated power output Pfcconst having a constant value in the high-power-efficiency region are used.

By performing control in this manner, the fuel cell system can be operated with high power efficiency in the entire region from the low-output region Psd to the high-output region Pld of the power supply output Ppower (load output Pload).

Furthermore, in the method for controlling the fuel cell system, in the step of controlling the generated power output, the load output Pload is transitioned from the low-output region Psd to the medium-output region Pmd when a differential voltage (Vbat−Vfc) obtained by subtracting the generated power voltage Vfc from the stored power voltage Vbat decreases to the threshold differential voltage ΔVth determined in advance.

As a result, it is possible to switch between the low-output region Psd and the medium-output region Pmd with simple control.

Furthermore, in the method for controlling the fuel cell system, in the step of controlling the generated power output Pfc, the load output Pload may be transitioned from the medium-output region Pmd to the high-output region Pld when the generated power voltage Vfc decreases to the threshold voltage Vfcb determined in advance or when the generated power current Ifc exceeds the threshold generated power current Ifcb determined in advance.

Also in this case, it is possible to switch between the medium-output region Pmd and the high-output region Pld with simple control.

The motor 12 may be a traction motor of the fuel cell vehicle 10.

The fuel cell system and the fuel cell vehicle 10 according to the present invention each include: the fuel cell configured to generate the generated power voltage Vfc; the power storage device 24 configured to generate the stored power voltage Vbat; the load 18 that is formed from the motor 12 and the inverter 26, the inverter 26 including a DC terminal connected to the power storage device 24, and an AC terminal connected to the motor 12; the boost converter 22 including an input terminal connected to the fuel cell 20, and an output terminal connected to the DC terminal of the inverter 26 and to the power storage device 24; the memory; and the central processing unit (CPU) configured to execute the program recorded in the memory, wherein when the CPU controls the fuel cell 20, the power storage device 24, the motor 12, the inverter 26, and the boost converter 22, the CPU executes the program recorded in the memory to control the generated power output Pfc that is electric power of the fuel cell 20, in a manner so that the stored power voltage Vbat does not fall below the generated power voltage Vfc.

In the fuel cell system and the fuel cell vehicle 10, the generated power voltage Vfc can be boosted to the stored power voltage Vbat at all times by the boost converter 22. Therefore, it is possible to avoid a situation in which the boosting operation of the boost converter 22 is disabled due to the generated power voltage Vfc exceeding the stored power voltage Vbat, and in which the fuel cell 20 and the power storage device 24 are directly connected to each other through the boost converter 22 in a non-boost state. Therefore, it is possible to prevent deterioration of the fuel cell 20 caused by the impossibility of control of the generated power output Pfc.

As a result, it is possible to eliminate a step-up/down converter for the power storage device, which is disposed between the power storage device 24 and the DC terminal of the inverter 26 and which has been required in the related art. Therefore, it is possible to reduce the cost for the eliminated step-up/down converter. Further, a space corresponding to the step-up/down converter can be increased.

The present invention is not limited to the embodiment and the modification described above, and various configurations can be adopted therein without departing from the gist of the present invention.

What is claimed is:

1. A method for controlling a fuel cell system, wherein the fuel cell system includes:
   a fuel cell configured to generate a voltage that is a generated power voltage;
   a power storage device configured to generate a voltage that is a stored power voltage;
   a load that is formed from a motor and an inverter, the inverter including a direct current terminal connected to the power storage device, and an alternating current terminal connected to the motor; and
   a boost converter including an input terminal connected to the fuel cell, and an output terminal connected to the direct current terminal of the inverter and to the power storage device,
   the method comprising:
   acquiring the generated power voltage and the stored power voltage; and
   controlling a generated power output that is electric power of the fuel cell, in a manner so that the stored power voltage does not fall below the generated power voltage,
   wherein in controlling the generated power output, control is performed in a manner so that:
   in a low-output region of a load output, which is electric power required by the load, while the fuel cell is maintained in an idle state in which the generated power voltage of the fuel cell is held at a constant voltage incapable of covering the load output, the load output is covered only by a stored power output obtained by varying electric power of the power storage device;
   in a medium-output region of the load output, the load output is covered by the stored power output with a constant value and the generated power output obtained by varying the electric power of the fuel cell; and
   in a high-output region of the load output, the load output is covered by the generated power output with a constant value and a stored power output obtained by varying the stored power output.

2. The method for controlling the fuel cell system according to claim 1, wherein
   in the controlling of the generated power output, control is performed in a manner so that the load output, which is electric power required by the load, is covered by the generated power output and a stored power output of the power storage device in accordance with an output allocation basis determined in advance in accordance with a magnitude of the load output.

3. The method for controlling the fuel cell system according to claim 1, wherein
   in the controlling of the generated power output,
   the load output is transitioned from the low-output region to the medium-output region when a differential voltage obtained by subtracting the generated power voltage from the stored power voltage decreases to a threshold differential voltage determined in advance.

4. The method for controlling the fuel cell system according to claim 3, wherein
   in the controlling of the generated power output,
   the load output is transitioned from the medium-output region to the high-output region when the generated power voltage decreases to a threshold voltage determined in advance or when a generated power current exceeds a threshold generated power current determined in advance.

5. The method for controlling the fuel cell system according to claim 1, wherein
   in the controlling of the generated power output,
   the load output is transitioned from the medium-output region to the high-output region when the generated power voltage decreases to a threshold voltage determined in advance or when a generated power current exceeds a threshold generated power current determined in advance.

6. A fuel cell vehicle comprising:
a fuel cell configured to generate a voltage that is a generated power voltage;
a power storage device configured to generate a voltage that is a stored power voltage;
a load that is formed from a motor and an inverter, the inverter including a direct current terminal connected to the power storage device, and an alternating current terminal connected to the motor;
a boost converter including an input terminal connected to the fuel cell, and an output terminal connected to the direct current terminal of the inverter and to the power storage device;
a memory; and
a central processing unit configured to execute instructions recorded in the memory, wherein
when the central processing unit controls the fuel cell, the power storage device, the motor, the inverter, and the boost converter, the central processing unit executes the instructions recorded in the memory to control a generated power output that is electric power of the fuel cell, in a manner so that the stored power voltage does not fall below the generated power voltage, wherein
control is performed in a manner so that:
in a low-output region of a load output, which is electric power required by the load, while the fuel cell is maintained in an idle state in which the generated power voltage of the fuel cell is held at a constant voltage incapable of covering the load output, the load output is covered only by a stored power output obtained by varying electric power of the power storage device:
in a medium-output region of the load output, the load output is covered by the stored power output with a constant value and the generated power output obtained by varying the electric power of the fuel cell; and
in a high-output region of the load output, the load output is covered by the generated power output with a constant value and a stored power output obtained by varying the stored power output.

7. A fuel cell system comprising:
a fuel cell configured to generate a voltage that is a generated power voltage;
a power storage device configured to generate a voltage that is a stored power voltage;
a load that is formed from a motor and an inverter, the inverter including a direct current terminal connected to the power storage device, and an alternating current terminal connected to the motor;
a boost converter including an input terminal connected to the fuel cell, and an output terminal connected to the direct current terminal of the inverter and to the power storage device;
a memory; and
a central processing unit configured to execute instructions recorded in the memory, wherein
when the central processing unit controls the fuel cell, the power storage device, the motor, the inverter, and the boost converter, the central processing unit executes the instructions recorded in the memory to control a generated power output that is electric power of the fuel cell, in a manner so that the stored power voltage does not fall below the generated power voltage, wherein
control is performed in a manner so that:
in a low-output region of a load output, which is electric power required by the load, while the fuel cell is maintained in an idle state in which the generated power voltage of the fuel cell is held at a constant voltage incapable of covering the load output, the load output is covered only by a stored power output obtained by varying electric power of the power storage device:
in a medium-output region of the load output, the load output is covered by the stored power output with a constant value and the generated power output obtained by varying the electric power of the fuel cell; and
in a high-output region of the load output, the load output is covered by the generated power output with a constant value and a stored power output obtained by varying the stored power output.

8. A method for controlling a fuel cell system, wherein the fuel cell system includes:
a fuel cell configured to generate a voltage that is a generated power voltage;
a power storage device configured to generate a voltage that is a stored power voltage;
a load that is formed from a motor and an inverter, the inverter including a direct current terminal connected to the power storage device, and an alternating current terminal connected to the motor; and
a boost converter including an input terminal connected to the fuel cell, and an output terminal connected to the direct current terminal of the inverter and to the power storage device,
the method comprising:
acquiring the generated power voltage and the stored power voltage; and
controlling a generated power output that is electric power of the fuel cell, in a manner so that the stored power voltage does not fall below the generated power voltage by covering a low-output region of a load output, which is electric power required by the load, by power supply output which is a combined output of a constant stored power output and the generated power output in a case where a differential voltage obtained by subtracting the generated power voltage from the stored power voltage decreases to a threshold differential voltage determined in advance,
wherein in controlling the generated power output, control is performed in a manner so that:
in the low-output region of a load output, which is electric power required by the load, the load output is covered only by a stored power output obtained by varying electric power of the power storage device;
in a medium-output region of the load output, the load output is covered by the stored power output with a constant value and the generated power output obtained by varying the electric power of the fuel cell; and
in a high-output region of the load output, the load output is covered by the generated power output with a constant value and a stored power output obtained by varying the stored power output.

* * * * *